(12) United States Patent
Tang (10) Patent No.: US 12,475,956 B2
(45) Date of Patent: Nov. 18, 2025

(54) CONTROL METHOD FOR NAND FLASH MEMORY TO COMPLETE XNOR OPERATION

(71) Applicant: UNIM Innovation (Wuxi) Co., Ltd., Wuxi (CN)

(72) Inventor: Qiang Tang, Wuxi (CN)

(73) Assignee: UNIM Innovation (Wuxi) Co., Ltd., Wuxi (CN)

( * ) Notice: Subject to any disclaimer, the term of this patent is extended or adjusted under 35 U.S.C. 154(b) by 235 days.

(21) Appl. No.: 18/532,526

(22) Filed: Dec. 7, 2023

(65) Prior Publication Data

US 2024/0194271 A1    Jun. 13, 2024

(30) Foreign Application Priority Data

Dec. 13, 2022   (CN) .......................... 202211619068.9

(51) Int. Cl.
*G11C 16/04*   (2006.01)
*G11C 16/26*   (2006.01)

(52) U.S. Cl.
CPC .......... *G11C 16/26* (2013.01); *G11C 16/0483* (2013.01)

(58) Field of Classification Search
CPC ..... G11C 16/26; G11C 16/0483; G11C 11/54; G11C 11/5642; G11C 16/10

USPC ...................................................... 365/185.11
See application file for complete search history.

(56) References Cited

U.S. PATENT DOCUMENTS

| | | | | |
|---|---|---|---|---|
| 7,212,435 B2* | 5/2007 | Rudeck | .................. | G11C 16/10 365/185.23 |
| 8,218,365 B2* | 7/2012 | Kim | .................... | G11C 16/3454 365/185.17 |
| 9,299,438 B2* | 3/2016 | Hara | ....................... | G11C 29/28 |
| 10,957,396 B2* | 3/2021 | Lee | .......................... | G11C 11/54 |
| 11,461,624 B2* | 10/2022 | Lee | .......................... | G06N 3/04 |

\* cited by examiner

*Primary Examiner* — Tha-O H Bui
(74) *Attorney, Agent, or Firm* — ZIEGLER IP LAW GROUP, LLC.

(57) ABSTRACT

The present invention provides a control method for an NAND flash memory to complete an XNOR operation, including: providing an NAND flash memory, where the NAND flash memory includes at least one memory block and multiple sense amplifiers, the memory block includes multiple synaptic strings, multiple bit lines and multiple word lines, the synaptic string includes multiple memory cells connected in series, the synaptic strings are connected to the bit lines in one-to-one correspondence, the word lines are all connected to all the synaptic strings, and the sense amplifiers are connected to the bit lines in one-to-one correspondence, thereby completing the XNOR operation of the NAND flash memory by controlling a storage mode of data and a voltage of the word line.

10 Claims, 4 Drawing Sheets

| Providing an NAND flash memory, where the NAND flash memory includes at least one memory block and multiple sense amplifiers, the memory block includes multiple synaptic strings, multiple bit lines and multiple word lines, the synaptic string includes multiple memory cells connected in series, the synaptic strings are connected to the bit lines in one-to-one correspondence, the word lines are all connected to all the synaptic strings, and the sense amplifiers are connected to the bit lines in one-to-one correspondence | S0 |
|---|---|
| In a same memory block, selecting any one of the synaptic strings as a first synaptic string, selecting any one of the remaining synaptic strings as a second synaptic string, selecting any one of memory cells in the first synaptic string as a first memory cell, selecting any one of memory cells in the second synaptic string as a second memory cell, writing first data into the first memory cell and writing second data into the second memory cell, where the word lines connected to the first memory cell are different from the word lines connected to the second memory cell, and the first data and the second data are mutually inverted data | S1 |
| Applying a first potential voltage to the word lines connected to the first memory cell and a second potential voltage to the word lines connected to the second memory cell, the first potential voltage being different from the second potential voltage | S2 |
| Reading data from the first synaptic string through a corresponding sense amplifier and outputting first operation data, and reading data from the second synaptic string through a corresponding sense amplifier and outputting second operation data | S3 |
| Obtaining result data according to at least one of the first operation data and the second operation data | S4 |

CONTROL METHOD FOR NAND FLASH MEMORY TO COMPLETE XNOR OPERATION

FIELD OF THE TECHNOLOGY

The present invention relates to the technical field of the NAND flash memories, and in particular, to a control method for a NAND flash memory to complete XNOR operation.

BACKGROUND

Figure 1:
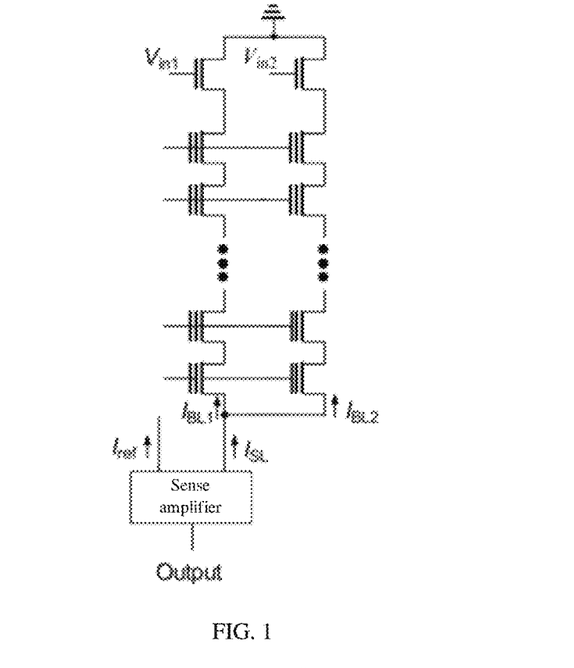
FIG. 1 is a schematic circuit diagram of a NAND flash memory for completing an XNOR operation in the prior art.
Figure 2:
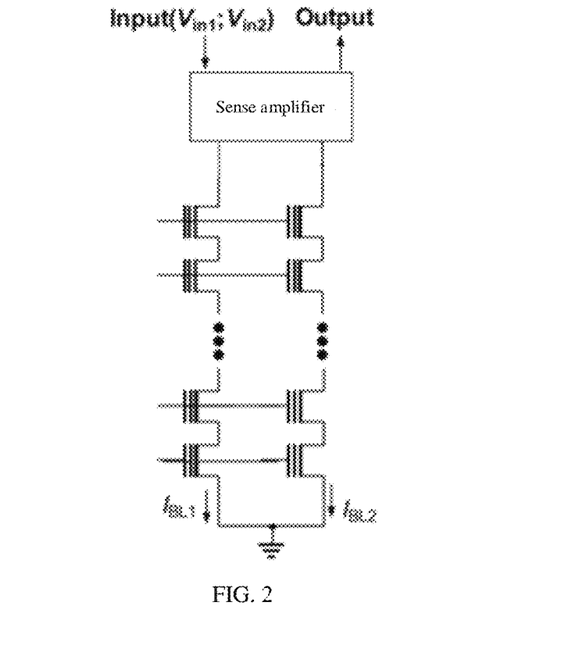
FIG. 2 is a schematic circuit diagram of another NAND flash memory for completing the XNOR operation in the prior art.

FIG. 1 is a schematic circuit diagram of a NAND flash memory for completing an XNOR operation in the prior art, and FIG. 2 is a schematic circuit diagram of another NAND flash memory for completing an XNOR operation in the prior art. Referring to FIGS. 1 and 2, one sense amplifier is connected to two bit lines, which is incompatible with a normal NAND flash memory; and each bit line is controlled by a separate switch, which is also incompatible with a structure of the normal NAND flash memory and will increase the area cost.

Therefore, in order to resolve the foregoing problem in the prior art, it is necessary to provide a new control method for an NAND flash memory to complete an XNOR operation.

SUMMARY

The present invention aims to provide a control method for an NAND flash memory to complete an XNOR operation, which completes the XNOR operation on the basis of being compatible with a normal NAND flash memory structure.

To achieve the foregoing objective, the control method for the NAND flash memory to complete the XNOR operation in the present invention includes the following steps:
  S0, providing an NAND flash memory, wherein the NAND flash memory comprises at least one memory block and multiple sense amplifiers, the memory block comprises multiple synaptic strings, multiple bit lines and multiple word lines, the synaptic string comprises multiple memory cells connected in series, the synaptic strings are connected to the bit lines in one-to-one correspondence, the word lines are all connected to all the synaptic strings, and the sense amplifiers are connected to the bit lines in one-to-one correspondence;
  S1, in a common memory block, selecting any one of the synaptic strings as a first synaptic string, selecting any one of the remaining synaptic strings as a second synaptic string, selecting any one of memory cells in the first synaptic string as a first memory cell, selecting any one of memory cells in the second synaptic string as a second memory cell, writing first data into the first memory cell and writing second data into the second memory cell, wherein the word lines connected to the first memory cell are different from the word lines connected to the second memory cell, and the first data and the second data are mutually inverted data;
  S2, applying a first potential voltage to the word lines connected to the first memory cell and a second potential voltage to the word lines connected to the second memory cell, the first potential voltage being different from the second potential voltage;
  S3, reading data from the first synaptic string through a corresponding sense amplifier and outputting first operation data, and reading data from the second synaptic string through a corresponding sense amplifier and outputting second operation data; and
  S4, obtaining result data according to at least one of the first operation data and the second operation data.

The control method for the NAND flash memory to complete the XNOR operation has the advantages that: a sense amplifier is connected to a bit line of a memory block, and on the basis of being compatible with the normal NAND flash memory, the control method includes the following steps: in a common memory block, selecting any one of the synaptic strings as a first synaptic string, selecting any one of the remaining synaptic strings as a second synaptic string, selecting any one of memory cells in the first synaptic string as a first memory cell, selecting any one of memory cells in the second synaptic string as a second memory cell, writing first data into the first memory cell and writing second data into the second memory cell, where the word lines connected to the first memory cell are different from the word lines connected to the second memory cell, and the first data and the second data are mutually inverted data; applying a first potential voltage to the word lines connected to the first memory cell and a second potential voltage to the word lines connected to the second memory cell, the first potential voltage being different from the second potential voltage; reading data from the first synaptic string through a corresponding sense amplifier and outputting first operation data, and reading data from the second synaptic string through a corresponding sense amplifier and outputting second operation data; and obtaining result data according to at least one of the first operation data and the second operation data, thereby completing the XNOR operation of the NAND flash memory by controlling a storage mode of data and the voltage of the word line.

Optionally, before the step S1 is executed, a step of setting a threshold voltage is further included, wherein both the first data and the second data are binary data, and when the first data is binary data "1" and the second data is binary data "0", the step of setting the threshold voltage includes:
  setting a threshold voltage of the first memory cell as a first threshold voltage, setting a threshold voltage of the second memory cell as a second threshold voltage, and setting threshold voltages of the remaining memory cells as a third threshold voltage, wherein the third threshold voltage is less than the first threshold voltage, and the first threshold voltage is less than the second threshold voltage; and
  when the first data is binary data "0" and the second data is binary data "1", the step of setting the threshold voltage comprises:
  setting a threshold voltage of the second memory cell as a first threshold voltage, setting a threshold voltage of the first memory cell as a second threshold voltage, and setting threshold voltages of the remaining memory cells as a third threshold voltage, wherein the third threshold voltage is less than the first threshold voltage, and the first threshold voltage is less than the second threshold voltage.

Optionally, the first potential voltage is greater than the third threshold voltage and less than the first threshold voltage, the second potential voltage is greater than the first threshold voltage and less than the second threshold voltage, or, the second potential voltage is greater than the third threshold voltage and less than the first threshold voltage, and the first potential voltage is greater than the first threshold voltage and less than the second threshold voltage.

Optionally, the step S1 includes:
   writing first data or second data into the remaining memory cells of the first synaptic string and writing first data or second data into the remaining memory cells of the second synaptic string, wherein in the first synaptic string and the second synaptic string, and at least one of two memory cells connected with one word line does not store data.

Optionally, the step S2 further includes: applying a third potential voltage to the remaining word lines, the third potential voltage being different from the first potential voltage and the second potential voltage.

Optionally, the first potential voltage is greater than the third threshold voltage and less than the first threshold voltage, the second potential voltage is greater than the first threshold voltage and less than the second threshold voltage and the third potential voltage is greater than the second threshold voltage, or, the second potential voltage is greater than the third threshold voltage and less than the first threshold voltage, the first potential voltage is greater than the first threshold voltage and less than the second threshold voltage, and the third potential voltage is greater than the second threshold voltage.

Optionally, the obtaining result data according to at least one of the first operation data and the second operation data includes:
   performing an NOR logic operation, an OR logic operation, an AND logic operation or a NAND logic operation on the first operation data and the second operation data to obtain the result data.

Optionally, before the step S1 is executed, a step of setting a threshold voltage is further included, wherein both the first data and the second data are binary data, and when the first data is binary data "1" and the second data is binary data "0", the step of setting the threshold voltage includes:
   setting a threshold voltage of the first memory cell as a first threshold voltage, setting a threshold voltage of the second memory cell as a second threshold voltage, and setting threshold voltages of the remaining memory cells as a first threshold voltage, wherein the first threshold voltage is less than the second threshold voltage.

Optionally, before the step S1 is executed, a step of setting a threshold voltage is further included, wherein both the first data and the second data are binary data, and when the first data is binary data "0" and the second data is binary data "1", the step of setting the threshold voltage includes:
   setting a threshold voltage of the second memory cell as a first threshold voltage, setting a threshold voltage of the first memory cell as a second threshold voltage, and setting threshold voltages of the remaining memory cells as a first threshold voltage, wherein the first threshold voltage is less than the second threshold voltage.

Optionally, the obtaining result data according to at least one of the first operation data and the second operation data includes:
   performing an AND logic operation or an NAND logic operation on the first operation data and the second operation data to obtain the result data.

BRIEF DESCRIPTION OF THE DRAWINGS

FIG. 3 is a flowchart of a control method for a NAND flash memory to complete an XNOR operation in some embodiments of the present invention;

DESCRIPTION OF THE EMBODIMENTS

In order to make the objectives, technical solutions and advantages of the present invention clearer, the technical solutions in the embodiments of the present invention will be described clearly and completely below in conjunction with accompanying drawings. Apparently, the embodiments described are some of embodiments of the present invention, but not all of the embodiments. All of the other embodiments, obtained by those of ordinary skill in the art based on the embodiments of the present invention without any inventive efforts, fall into the protection scope of the present invention. Unless defined otherwise, technical or scientific terms used herein have the same meaning as commonly understood by one of ordinary skill in the art to which the present invention belongs. The terms such as "include" used in this specification mean that the elements or objects mentioned before the terms encompass the elements, objects, or their equivalents listed after the terms, without excluding other elements or objects.

As for the problem existing in the related art, embodiments of the present invention provide a control method for a NAND flash memory to complete an XNOR operation. Referring to FIG. 3, the control method for the NAND flash memory to complete the XNOR operation includes the following steps:

S0, providing an NAND flash memory, wherein the NAND flash memory comprises at least one memory block and multiple sense amplifiers, the memory block comprises multiple synaptic strings, multiple bit lines and multiple word lines, the synaptic string comprises multiple memory cells connected in series, the synaptic strings are connected to the bit lines in one-to-one correspondence, the word lines are all connected to all the synaptic strings, and the sense amplifiers are connected to the bit lines in one-to-one correspondence;

S1, in a common memory block, selecting any one of the synaptic strings as a first synaptic string, selecting any one of the remaining synaptic strings as a second synaptic string, selecting any one of memory cells in the first synaptic string as a first memory cell, selecting any one of memory cells in the second synaptic string as a second memory cell, writing first data into the first memory cell and writing second data into the second memory cell, wherein the word lines connected to the first memory cell are different from the word lines connected to the second memory cell, and the first data and the second data are mutually inverted data;

S2, applying a first potential voltage to the word lines connected to the first memory cell and a second potential voltage to the word lines connected to the second memory cell, the first potential voltage being different from the second potential voltage;

S3, reading data from the first synaptic string through a corresponding sense amplifier and outputting first operation data, and reading data from the second synaptic string through a corresponding sense amplifier and outputting second operation data; and S4, obtaining result data according to at least one of the first operation data and the second operation data.

In some embodiments, before the step S1 is executed, a step of setting a threshold voltage is further included, where the first data and the second data are both binary data, and when the first data is binary data "1" and the second data is binary data "0", the step of setting the threshold voltage includes: setting a threshold voltage of the first memory cell as a first threshold voltage, setting a threshold voltage of the second memory cell as a second threshold voltage, and setting threshold voltages of the remaining memory cells as a third threshold voltage, where the third threshold voltage is less than the first threshold voltage, and the first threshold voltage is less than the second threshold voltage.

In some embodiments, before executing the step S1, a step of setting the threshold voltage is further included, wherein both the first data and the second data are binary data, and when the first data is binary data "0" and the second data is binary data "1", the step of setting the threshold voltage includes: setting a threshold voltage of the second memory cell as a first threshold voltage, setting a threshold voltage of the first memory cell as a second threshold voltage, and setting threshold voltages of the remaining memory cells as a third threshold voltage, wherein the third threshold voltage is less than the first threshold voltage, and the first threshold voltage is less than the second threshold voltage.

In some embodiments, the first potential voltage is greater than the third threshold voltage and less than the first threshold voltage, and the second potential voltage is greater than the first threshold voltage and less than the second threshold voltage, or, the second potential voltage is greater than the third threshold voltage and less than the first threshold voltage, and the first potential voltage is greater than the first threshold voltage and less than the second threshold voltage.

In some embodiments, the obtaining result data according to at least one of the first operation data and the second operation data includes: performing an NOR logic operation, an OR logic operation, an AND logic operation or a NAND logic operation on the first operation data and the second operation data to obtain the result data.

Figure 4:
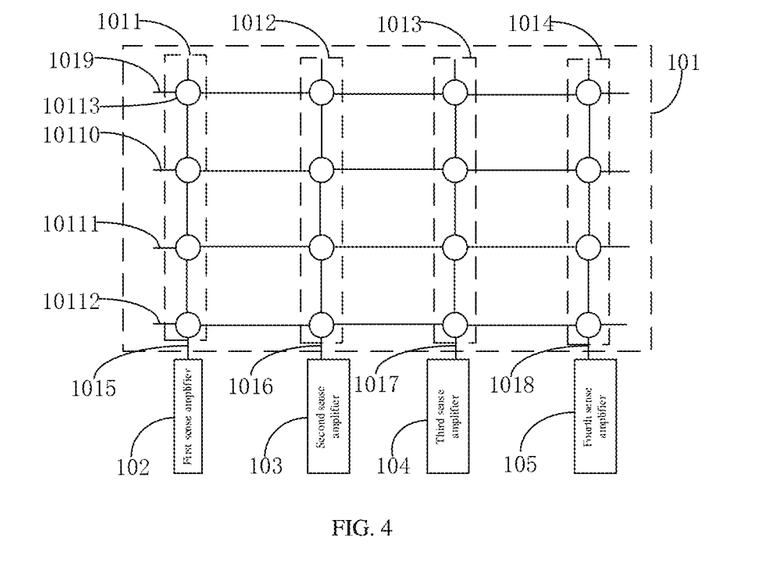
FIG. 4 is a schematic structural diagram of a NAND flash memory in some embodiments of the present invention.

FIG. 4 is a schematic structural diagram of a NAND flash memory in some embodiments of the present invention. Referring to FIG. 4, the NAND flash memory includes a first memory block 101, a first sense amplifier 102, a second sense amplifier 103, a third sense amplifier 104 and a fourth sense amplifier 105.

Referring to FIG. 4, the first memory block 101 includes four synaptic strings, four bit lines and four word lines, where the four synaptic strings are respectively a first synaptic string 1011, a second synaptic string 1012, a third synaptic string 1013 and a fourth synaptic string 1014, the four bit lines are respectively a first bit line 1015, a second bit line 1016, a third bit line 1017 and a fourth bit line 1018, the four word lines are respectively a first word line 1019, a second word line 10110, a third word line 10111 and a fourth word line 10112, and each of the first synaptic string 1011, the second synaptic string 1012, the third synaptic string 1013 and the fourth synaptic string 1014 includes four memory cells 10113 connected in series.

Referring to FIG. 4, the first synaptic string 1011 is connected to the first sense amplifier 102 through the first bit line 1015, the second synaptic string 1012 is connected to the second sense amplifier 103 through the second bit line 1016, the third synaptic string 1013 is connected to the third sense amplifier 104 through the third bit line 1017, and the fourth synaptic string 1014 is connected to the fourth sense amplifier 105 through the fourth bit line 1018.

Referring to FIG. 4, the first word line 1019 is connected to a 1st memory cell of the first synaptic string 1011, a 1st memory cell of the second synaptic string 1012, a 1st memory cell of the third synaptic string 1013 and a 1st memory cell of the fourth synaptic string 1014; the second word line 10110 is connected to a 2nd memory cell of the first synaptic string 1011, a 2nd memory cell of the second synaptic string 1012, a 2nd memory cell of the third synaptic string 1013 and a 2nd memory cell of the fourth synaptic string 1014; the third word line 10111 is connected to a 3rd memory cell of the first synaptic string 1011, a 3rd memory cell of a second synaptic string 1012, a 3rd memory cell of a third synaptic string 1013 and a 3rd memory cell of a fourth synaptic string 1014; and the fourth word line 10112 is connected to a 4th memory cell of the first synaptic string 1011, a 4th memory cell of the second synaptic string 1012, a 4th memory cell of the third synaptic string 1013 and a 4th memory cell of the fourth synaptic string 1014.

Figure 5:
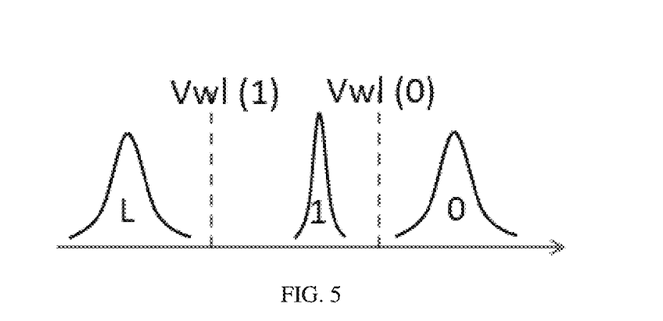
FIG. 5 is a schematic diagram of threshold voltage distribution in first embodiments of the present invention.

FIG. 5 is a schematic diagram of threshold voltage distribution in first embodiments of the present invention. Referring to FIG. 5, L represents a distribution curve of the third threshold voltage, 1 represents a distribution curve of the first threshold voltage, 0 represents a distribution curve of the second threshold voltage, $V_{W1(1)}$ represents a voltage when binary data "1" is inputted, and $V_{W1(0)}$ represents a voltage when binary data "0" is inputted.

Referring to FIGS. 4 and 5, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(0)}$, which is equivalent to providing binary data "0" for the XNOR operation through the first word line 1019; a second potential voltage is applied to the second word line 10110, a magnitude of the second potential voltage being $V_{W1(1)}$; at this time, the first sense amplifier 102 can read data from the first synaptic string 1011 and output first operation data which is binary data "0", the second sense amplifier 103 can read data from the second synaptic string 1012 and output second operation data which is binary data "0", and then the NOR logic operation is performed on the first operation data and the second operation data to obtain result data which is binary data "1", that is, the XNOR operation of binary data "0" and binary data "0" is completed through the NAND flash memory.

Figure 8:
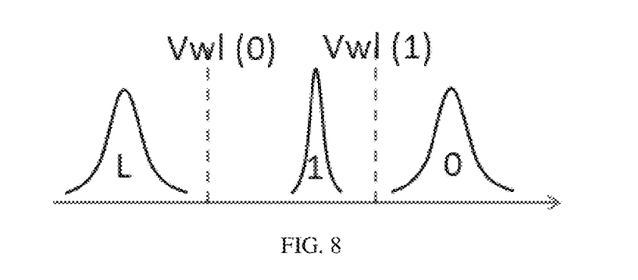
FIG. 8 is a schematic diagram of threshold voltage distribution in fourth embodiments of the present invention.

FIG. 8 is a schematic diagram of threshold voltage distribution in fourth embodiments of the present invention. Referring to FIG. 8, L represents a distribution curve of the third threshold voltage, 1 represents a distribution curve of the first threshold voltage, 0 represents a distribution curve of the second threshold voltage, $V_{W1(1)}$ represents a voltage when binary data "1" is inputted, and $V_{W1(0)}$ represents a voltage when binary data "0" is inputted.

Referring to FIGS. 4 and 8, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(0)}$, which is equivalent to providing binary data "0" for the XNOR operation through the first word line 1019, and a second potential voltage is applied to the second word line 10110, a magnitude of the second potential voltage being $V_{W1(1)}$. Compared with the threshold distribution shown in FIG. 5, if the results of the first sense amplifier 102 and the second sense amplifier 103 are inverted, that is, the first operation data is binary data "1" and the second operation data is binary data "1", then the AND logic operation is performed on the first operation data and the second operation data to obtain result data, the result data being binary data "1". If the result of the first sense amplifier 102 or the second sense amplifier 103 is inverted, that is, the first operation data is binary data "1" and the second operation data is binary data "0", then the OR logic operation or NAND logic operation is performed on the first operation data and the second operation data to obtain result data, the result data being binary data "1"; if the first operation data is binary data "0" and the second operation data is binary data "1", then the OR logic operation or NAND logic operation is performed on the first operation data and the second operation data to obtain result data, the result data being binary data "1".

Referring to FIGS. 4 and 5, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(1)}$, which is equivalent to providing binary data "1" for the XNOR operation through the first word line 1019; a second potential voltage is applied to the second word line 10110, a magnitude of the second potential voltage being $V_{W1(0)}$; at this time, the first sense amplifier 102 can read data from the first synaptic string 1011 and output first operation data which is binary data "0", the second sense amplifier 103 can read data from the second synaptic string 1012 and output second operation data which is binary data "0", and then the NOR logic operation is performed on the first operation data and the second operation data to obtain result data which is binary data "1", that is, the XNOR operation of binary data "1" and binary data "1" is completed through the NAND flash memory.

Referring to FIGS. 4 and 8, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(1)}$, which is equivalent to providing binary data "1" for the XNOR operation through the first word line 1019, and a second potential voltage is applied to the second word line 10110, a magnitude of the second potential voltage being $V_{W1(0)}$. Compared with the threshold distribution shown in FIG. 5, if the results of the first sense amplifier 102 and the second sense amplifier 103 are inverted, that is, the first operation data is binary data "1" and the second operation data is binary data "1", then the AND logic operation is performed on the first operation data and the second operation data to obtain result data, the result data being binary data "1". If the result of the first sense amplifier 102 or the second sense amplifier 103 is inverted, that is, the first operation data is binary data "1" and the second operation data is binary data "0", then the OR logic operation or NAND logic operation is performed on the first operation data and the second operation data to obtain result data, the result data being binary data "1"; if the first operation data is binary data "0" and the second operation data is binary data "1", then the OR logic operation or NAND logic operation is performed on the first operation data and the second operation data to obtain result data, the result data being binary data "1".

Referring to FIGS. 4 and 5, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(0)}$, which is equivalent to providing binary data "0" for the XNOR operation through the first word line 1019; a second potential voltage is applied to the second word line 10110, a magnitude of the second potential voltage being $V_{W1(1)}$ at this time, the first sense amplifier 102 can read data from the first synaptic string 1011 and output first operation data which is binary data "1", the second sense amplifier 103 can read data from the second synaptic string 1012 and output second operation data which is binary data "0", and then the NOR logic operation is performed on the first operation data and the second operation data to obtain result data which is binary data "0", that is, the XNOR operation of binary data "0" and binary data "1" is completed through the NAND flash memory.

Referring to FIGS. 4 and 8, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(0)}$, which is equivalent to providing binary data "0" for the XNOR operation through the first word line 1019, and a second potential voltage is applied to the second word line 10110, a magnitude of the second potential voltage being $V_{W1(1)}$. Compared with the threshold distribution shown in FIG. 5, if the results of the first sense amplifier 102 and the second sense amplifier 103 are inverted, that is, the first operation data is binary data "0" and the second operation data is binary data "1", then the AND logic operation is performed on the first operation data and the second operation data to obtain result data, the result data being binary data "0". If the result of the first sense amplifier 102 or the second sense amplifier 103 is inverted, that is, the first operation data is binary data "0" and the second operation data is binary data "0", then the OR logic operation is performed on the first operation data and the second operation data to obtain result data, the result data being binary data "0"; if the first operation data is binary data "1" and the second operation data is binary data "1", the NAND logic operation is performed on the first operation data and the second operation data to obtain result data, the result data being binary data "0".

Referring to FIGS. 4 and 5, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(1)}$, which is equivalent to providing binary data "1" for the XNOR operation through the first word line 1019; a second potential voltage is applied to the second word line 10110, a magnitude of the second potential voltage being $V_{W1(0)}$; at this time, the first sense amplifier 102 can read data from the first synaptic string 1011 and output first operation data which is binary data "0", the second sense amplifier 103 can read data from the second synaptic string 1012 and output second operation data which is binary data "1", and then the NOR logic operation is performed on the first operation data and the second operation data to obtain result data which is binary data "0", that is, the XNOR operation of binary data "1" and binary data "0" is completed through the NAND flash memory.

Referring to FIGS. 4 and 8, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(1)}$, which is equivalent to providing binary data "1" for the XNOR operation through the first word line 1019, and a second potential voltage is applied to the second word line 10110, a magnitude of the second potential voltage being $V_{W1(0)}$. Compared with the threshold distribution shown in FIG. 5, if the results of the first sense amplifier 102 and the second sense amplifier 103 are inverted, that is, the first operation data is binary data "1" and the second operation data is binary data "0", then the AND logic operation is performed on the first operation data and the second operation data to obtain result data, the result data being binary data "0". If the result of the first sense amplifier 102 or the second sense amplifier 103 is inverted, that is, the first operation data is binary data "0" and the second operation data is binary data "0", then the OR logic operation is performed on the first operation data and the second operation data to obtain result data, the result data being binary data "0"; if the first operation data is binary data "1" and the second operation data is binary data "1", the NAND logic operation is performed on the first operation data and the second operation data to obtain result data, the result data being binary data "0".

Referring to FIGS. 4 and 5, first data is written into the 3rd memory cell of the third synaptic string 1013, the first data being binary data "0"; second data is written into the 4th memory cell of the fourth synaptic string 1014, the second data being binary data "1"; and data is not written into the remaining memory cells of the first synaptic string 1011 and the remaining memory cells of the second synaptic string 1012. The 3rd memory cell of the third synaptic string 1013 is the first memory cell, and the 4th memory cell of the fourth synaptic string 1014 is the second memory cell. At this time, the same operations as those on the first synaptic string 1011 and the second synaptic string 1012 can be performed. And because the threshold voltage of the memory cells without data written is very low, the voltage on the word line is $V_{W1(1)}$ or $V_{W1(0)}$, and all the memory cells to which data not written are turned on.

In some embodiments, the step S1 further includes: writing first data or second data into the remaining memory cells of the first synaptic string and writing first data or second data into the remaining memory cells of the second synaptic string, where in the first synaptic string and the second synaptic string, at least one of two memory cells connected with one word line does not store data.

In some embodiments, the step S2 further includes: applying a third potential voltage to the remaining word lines, the third potential voltage being different from the first potential voltage and the second potential voltage.

In some embodiments, the first potential voltage is greater than the third threshold voltage and less than the first threshold voltage, the second potential voltage is greater than the first threshold voltage and less than the second threshold voltage, and the third potential voltage is greater than the second threshold voltage, or, the second potential voltage is greater than the third threshold voltage and less than the first threshold voltage, the first potential voltage is greater than the first threshold voltage and less than the second threshold voltage, and the third potential voltage is greater than the second threshold voltage.

Figure 6:
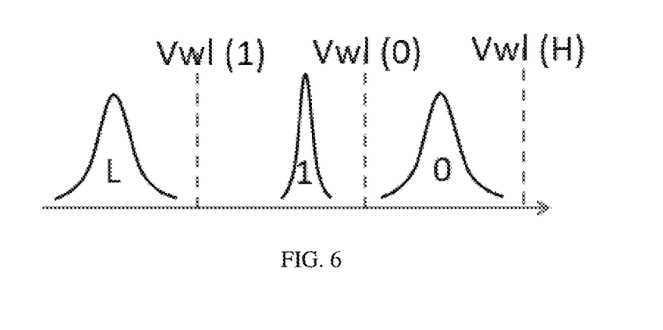
FIG. 6 is a schematic diagram of threshold voltage distribution in second embodiments of the present invention.

FIG. 6 is a schematic diagram of threshold voltage distribution in second embodiments of the present invention. Referring to FIG. 6, L represents a distribution curve of the third threshold voltage, 1 represents a distribution curve of the first threshold voltage, 0 represents a distribution curve of the second threshold voltage, $V_{W1(1)}$ represents a voltage when binary data "1" is inputted, $V_{W1(0)}$ represents a voltage when binary data "0" is inputted, and $V_{W1(H)}$ represents a third potential voltage.

Referring to FIGS. 4 and 6, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. First data is written into a 3rd memory cell of the first synaptic string 1011, the first data being binary data "0", and second data is written into a 2nd memory cell of the second synaptic string 1012, the second data being binary data "1". A threshold voltage of the first memory cell and a threshold voltage of the 3rd memory cell of the first synaptic string 1011 are set as a second threshold voltage, a threshold voltage of the second memory cell and a threshold voltage of the 4th memory cell of the second synaptic string 1012 are set as a first threshold voltage, and threshold voltages of the remaining memory cells of the first synaptic string 1011 and the remaining memory cells of the second synaptic string 1012 are set as a third threshold voltage, that is, the threshold voltage of the memory cells to which data is not written is the third threshold voltage L. A first potential voltage is applied to the first word line 1019, a magnitude of the first potential voltage being $V_{W1(0)}$, which is equivalent to providing binary data "0" for the XNOR operation through the first word line 1019; a second potential voltage is applied to the second word line 10110, a magnitude of the second potential voltage being $V_{W1(1)}$; a third potential voltage is applied to the third word line 10111 and the fourth word line 10112; at this time, the first sense amplifier 102 can read data from the first synaptic string 1011 and output first operation data which is binary data "0", the second sense amplifier 103 can read data from the second synaptic string 1012 and output second operation data which is binary data "0", and then the NOR logic operation is performed on the first operation data and the second operation data to obtain result data which is binary data "1", that is, the XNOR operation of binary data "0" and binary data "0" is completed through the NAND flash memory.

Referring to FIGS. 4 and 6, a first potential voltage is applied to the third word line 10111, a magnitude of the first potential voltage being $V_{W1(1)}$, which is equivalent to providing binary data "1" for the XNOR operation through the third word line 10111; a second potential voltage is applied to the second word line 10110, a magnitude of the second potential voltage being $V_{W1(0)}$; a third potential voltage is applied to the first word line 1019 and the second word line 10110; at this time, the first sense amplifier 102 can read data from the first synaptic string 1011 and output first operation data which is binary data "0", the second sense amplifier 103 can read data from the second synaptic string 1012 and output second operation data which is binary data "0", and then the NOR logic operation is performed on the first operation data and the second operation data to obtain result data which is binary data "1", that is, the XNOR operation of binary data "1" and binary data "1" is completed through the NAND flash memory.

In some embodiments, before the step S1 is executed, a step of setting a threshold voltage is further included, where both the first data and the second data are binary data, and when the first data is binary data "1" and the second data is binary data "0", the step of setting the threshold voltage includes: setting a threshold voltage of the first memory cell as a first threshold voltage, setting a threshold voltage of the second memory cell as a second threshold voltage, and setting threshold voltages of the remaining memory cells as a first threshold voltage, where the first threshold voltage is less than the second threshold voltage.

In some embodiments, before the step S1 is executed, a step of setting a threshold voltage is further included, where both the first data and the second data are binary data, and when the first data is binary data "0" and the second data is binary data "1", the step of setting the threshold voltage includes: setting a threshold voltage of the second memory cell as a first threshold voltage, setting a threshold voltage of the first memory cell as a second threshold voltage, and setting threshold voltages of the remaining memory cells as a first threshold voltage, where the first threshold voltage is less than the second threshold voltage.

In some embodiments, the obtaining result data according to at least one of the first operation data and the second operation data includes: performing an AND logic operation or an NAND logic operation on the first operation data and the second operation data to obtain the result data.

Figure 7:
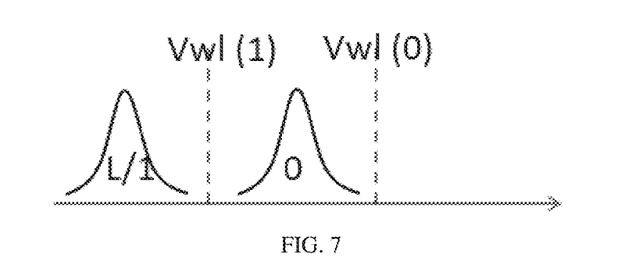
FIG. 7 is a schematic diagram of threshold voltage distribution in third embodiments of the present invention.

FIG. 7 is a schematic diagram of threshold voltage distribution in third embodiments of the present invention. Referring to FIG. 7, L/1 represents a distribution curve of the first threshold voltage, 0 represents a distribution curve of the second threshold voltage, $V_{W1(1)}$ represents a voltage when binary data "1" is inputted, and $V_{W1(0)}$ represents a voltage when binary data "0" is inputted.

Referring to FIGS. 4 and 7, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(0)}$, which is equivalent to providing binary data "0" for the XNOR operation through the first word line 1019; a second potential voltage is applied to the second word line 10110, a magnitude of the second potential voltage being $V_{W1(1)}$; at this time, the first sense amplifier 102 can read data from the first synaptic string 1011 and output first operation data which is binary data "1", the second sense amplifier 103 can read data from the second synaptic string 1012 and output second operation data which is binary data "1", and then the AND logic operation is performed on the first operation data and the second operation data to obtain result data which is binary data "1", that is, the XNOR operation of binary data "0" and binary data "0" is completed through the NAND flash memory.

Figure 9:
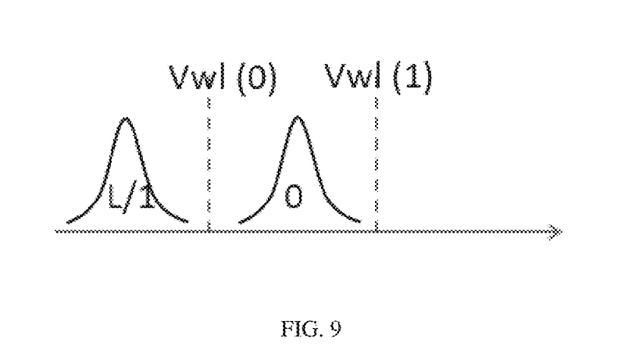
FIG. 9 is a schematic diagram of threshold voltage distribution in fifth embodiments of the present invention.

FIG. 9 is a schematic diagram of threshold voltage distribution in fifth embodiments of the present invention. Referring to FIG. 9, L/1 represents a distribution curve of the first threshold voltage, 0 represents a distribution curve of the second threshold voltage, $V_{W1(1)}$ represents a voltage when binary data "1" is inputted, and $V_{W1(0)}$ represents a voltage when binary data "0" is inputted.

Referring to FIGS. 4 and 9, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(0)}$, which is equivalent to providing binary data "0" for the XNOR operation through the first word line 1019, and a second potential voltage is applied to the second word line 10110, a magnitude of the second potential voltage being $V_{W1(1)}$. Compared with the threshold distribution shown in FIG. 7, if the result of the first sense amplifier 102 is inverted, that is, the first operation data is binary data "0" and the second operation data is binary data "1", then the NAND logic operation is performed on the first operation data and the second operation data to obtain result data, the result data being binary data "1".

Referring to FIGS. 4 and 7, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(1)}$ which is equivalent to providing binary data "1" for the XNOR operation through the first word line 1019; a second potential voltage is applied to the second word line 10110, a magnitude of the second potential voltage being $V_{W1(0)}$; at this time, the first sense amplifier 102 can read data from the first synaptic string 1011 and output first operation data which is binary data "1", the second sense amplifier 103 can read data from the second synaptic string 1012 and output second operation data which is binary data "1", and then the AND logic operation is performed on the first operation data and the second operation data to obtain result data which is binary data "1", that is, the XNOR operation of binary data "1" and binary data "1" is completed through the NAND flash memory.

Referring to FIGS. 4 and 9, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(1)}$, which is equivalent to providing binary data "1" for the XNOR operation through the first word line 1019, and a second potential voltage is applied to the second word line 10110, a magnitude of the second potential voltage being $V_{W1(0)}$. Compared with the threshold distribution shown in FIG. 7, if the result of the second sense amplifier 103 is inverted, that is, the first operation data is binary data "1" and the second operation data is binary data "0", then the NAND logic operation is performed on the first operation data and the second operation data to obtain result data, the result data being binary data "1".

Referring to FIGS. 4 and 7, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(0)}$, which is equivalent to providing binary data "0" for the XNOR operation through the first word line 1019; a second potential voltage is applied to the second word line 10110, a magnitude of the second potential voltage being $V_{W1(1)}$; at this time, the first sense amplifier 102 can read data from the first synaptic string 1011 and output first operation data which is binary data "1", the second sense amplifier 103 can read data from the second synaptic string 1012 and output second operation data which is binary data "0", and then the AND logic operation is performed on the first operation data and the second operation data to obtain result data which is binary data "0", that is, the XNOR operation of binary data "0" and binary data "1" is completed through the NAND flash memory.

Referring to FIGS. 4 and 9, first data is written into the 1st memory cell of the first synaptic string 1011, the first data being binary data "1"; second data is written into the 2nd memory cell of the second synaptic string 1012, the second data being binary data "0"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a first threshold voltage, a threshold voltage of the second memory cell is set as a second threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(0)}$, which is equivalent to providing binary data "0" for the XNOR operation through the first word line 1019, and a second potential voltage is applied to the second word line 10110, a magnitude of the second potential voltage being $V_{W1(1)}$. Compared with the threshold distribution shown in FIG. 7, if the result of the second sense amplifier 103 is inverted, that is, the first operation data is binary data "1" and the second operation data is binary data "1", then the NAND logic operation is performed on the first operation data and the second operation data to obtain result data, the result data being binary data "0".

Referring to FIGS. 4 and 7, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(1)}$ which is equivalent to providing binary data "1" for the XNOR operation through the first word line 1019; a second potential voltage is applied to the second word line 10110, a magnitude of the second potential voltage being $V_{W1(0)}$; at this time, the first sense amplifier 102 can read data from the first synaptic string 1011 and output first operation data which is binary data "0", the second sense amplifier 103 can read data from the second synaptic string 1012 and output second operation data which is binary data "1", and then the AND logic operation is performed on the first operation data and the second operation data to obtain result data which is binary data "0", that is, the XNOR operation of binary data "1" and binary data "0" is completed through the NAND flash memory.

Referring to FIGS. 4 and 9, first data is written into the 1st memory cell of the first synaptic string 1011, the first data being binary data "0"; second data is written into the 2nd memory cell of the second synaptic string 1012, the second data being binary data "1"; and data is not written into the remaining memory cells of the first synaptic string 1011 and the remaining memory cells of the second synaptic string 1012. The 1st memory cell of the first synaptic string 1011 is the first memory cell, and the 2nd memory cell of the second synaptic string 1012 is the second memory cell. A threshold voltage of the first memory cell is set as a second threshold voltage, a threshold voltage of the second memory cell is set as a first threshold voltage, and threshold voltages of the remaining memory cells of the first synaptic string 1011 and the remaining memory cells of the second synaptic string 1012 are set as a first threshold voltage. A first potential voltage is applied to the first word line 1019, a magnitude of the first potential voltage being $V_{W1(1)}$, which is equivalent to providing binary data "1" for the XNOR operation through the first word line 1019, and a second potential voltage is applied to the second word line 10110, a magnitude of the second potential voltage being $V_{W1(0)}$. Compared with the threshold distribution shown in FIG. 7, if the result of the first sense amplifier 102 is inverted, that is, the first operation data is binary data "1" and the second operation data is binary data "1", then the NAND logic operation is performed on the first operation data and the second operation data to obtain result data, the result data being binary data "0".

In some embodiments of the present invention, the threshold distribution as shown in FIGS. 5 and 7 is adopted; each sense amplifier is connected to a plurality of memory blocks, and steps S1 to S3 are executed in different memory blocks; at this time, current read by the corresponding sense amplifier is an accumulated current, that is, each binary data "1" corresponds to a portion of current, and the current can be converted into digital by an analog-to-digital converter, so that the number of binary data "1" in the first operation data and the number of binary data "1" in the second operation data can be obtained, and a difference between the total amount of the first data written and the amount of binary data "1", is the amount of binary data "0".

While detailed embodiments of the present invention have been described above, it is evident to those skilled in the art that various modifications and changes can be made to these embodiments. However, it should be understood that such modifications and changes fall within the scope and spirit of the present invention as described in the claims. Furthermore, the present invention, as described herein, may have other embodiments and may be implemented or realized in various ways.

What is claimed is:

1. A control method for a NAND flash memory to complete an XNOR operation, comprising the following steps:
    S0, providing an NAND flash memory, wherein the NAND flash memory comprises at least one memory block and multiple sense amplifiers, the memory block comprises multiple synaptic strings, multiple bit lines and multiple word lines, the synaptic string comprises multiple memory cells connected in series, the synaptic strings are connected to the bit lines in one-to-one correspondence, the word lines are all connected to all the synaptic strings, and the sense amplifiers are connected to the bit lines in one-to-one correspondence;
    S1, in a common memory block, selecting any one of the synaptic strings as a first synaptic string, selecting any one of the remaining synaptic strings as a second synaptic string, selecting any one of memory cells in the first synaptic string as a first memory cell, selecting any one of memory cells in the second synaptic string as a second memory cell, writing first data into the first memory cell and writing second data into the second memory cell, wherein the word lines connected to the first memory cell are different from the word lines connected to the second memory cell, and the first data and the second data are mutually inverted data;
    S2, applying a first potential voltage to the word lines connected to the first memory cell and a second potential voltage to the word lines connected to the second memory cell, the first potential voltage being different from the second potential voltage;
    S3, reading data from the first synaptic string through a corresponding sense amplifier and outputting first operation data, and reading data from the second synaptic string through a corresponding sense amplifier and outputting second operation data; and
    S4, obtaining result data according to at least one of the first operation data and the second operation data.

2. The control method for the NAND flash memory to complete the XNOR operation according to claim 1, further comprising a step of setting a threshold voltage before executing the step S1, wherein both the first data and the second data are binary data, and when the first data is binary data 1 and the second data is binary data 0, the step of setting the threshold voltage comprises:
    setting a threshold voltage of the first memory cell as a first threshold voltage, setting a threshold voltage of the second memory cell as a second threshold voltage, and setting threshold voltages of the remaining memory cells as a third threshold voltage, wherein the third threshold voltage is less than the first threshold voltage, and the first threshold voltage is less than the second threshold voltage; and
    when the first data is binary data 0 and the second data is binary data 1, the step of setting the threshold voltage comprises:
    setting a threshold voltage of the second memory cell as a first threshold voltage, setting a threshold voltage of the first memory cell as a second threshold voltage, and setting threshold voltages of the remaining memory cells as a third threshold voltage, wherein the third threshold voltage is less than the first threshold voltage, and the first threshold voltage is less than the second threshold voltage.

3. The control method for the NAND flash memory to complete the XNOR operation according to claim 2, wherein the first potential voltage is greater than the third threshold voltage and less than the first threshold voltage, the second potential voltage is greater than the first threshold voltage and less than the second threshold voltage, or, the second potential voltage is greater than the third threshold voltage and less than the first threshold voltage, and the first potential voltage is greater than the first threshold voltage and less than the second threshold voltage.

4. The control method for the NAND flash memory to complete the XNOR operation according to claim 2, wherein the step S1 further comprises:
    writing first data or second data into the remaining memory cells of the first synaptic string and writing first data or second data into the remaining memory cells of the second synaptic string, wherein in the first synaptic string and the second synaptic string, and at least one of two memory cells connected with one word line does not store data.

5. The control method for the NAND flash memory to complete the XNOR operation according to claim 4, wherein the step S2 further comprises: applying a third potential voltage to the remaining word lines, the third potential voltage being different from the first potential voltage and the second potential voltage.

6. The control method for the NAND flash memory to complete the XNOR operation according to claim 5, wherein the first potential voltage is greater than the third threshold voltage and less than the first threshold voltage, the second potential voltage is greater than the first threshold voltage and less than the second threshold voltage and the third potential voltage is greater than the second threshold voltage, or, the second potential voltage is greater than the third threshold voltage and less than the first threshold voltage, the first potential voltage is greater than the first threshold voltage and less than the second threshold voltage, and the third potential voltage is greater than the second threshold voltage.

7. The control method for the NAND flash memory to complete the XNOR operation according to claim 2, wherein the obtaining result data according to at least one of the first operation data and the second operation data comprises:
    performing an NOR logic operation, an OR logic operation, an AND logic operation or a NAND logic operation on the first operation data and the second operation data to obtain the result data.

8. The control method for the NAND flash memory to complete the XNOR operation according to claim 2, wherein the obtaining result data according to at least one of the first operation data and the second operation data comprises: performing an AND logic operation or a NAND logic operation on the first operation data and the second operation data to obtain the result data.

9. The control method for the NAND flash memory to complete the XNOR operation according to claim 1, further comprising a step of setting a threshold voltage before executing the step S1, wherein both the first data and the second data are binary data, and when the first data is binary data 1 and the second data is binary data 0, the step of setting the threshold voltage comprises:
   setting a threshold voltage of the first memory cell as a first threshold voltage, setting a threshold voltage of the second memory cell as a second threshold voltage, and setting threshold voltages of the remaining memory cells as a first threshold voltage, wherein the first threshold voltage is less than the second threshold voltage.

10. The control method for the NAND flash memory to complete the XNOR operation according to claim 1, further comprising a step of setting a threshold voltage before executing the step S1, wherein both the first data and the second data are binary data, and when the first data is binary data 0 and the second data is binary data 1, the step of setting the threshold voltage comprises:
   setting a threshold voltage of the second memory cell as a first threshold voltage, setting a threshold voltage of the first memory cell as a second threshold voltage, and setting threshold voltages of the remaining memory cells as a first threshold voltage, wherein the first threshold voltage is less than the second threshold voltage.

* * * * *